US006402392B1

(12) United States Patent
Yarita et al.

(10) Patent No.: US 6,402,392 B1
(45) Date of Patent: Jun. 11, 2002

(54) FERRULE TUBULAR BODY AND FERRULE

(75) Inventors: Mitsuo Yarita; Tomohiro Shimada, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/296,079

(22) Filed: Apr. 21, 1999

(30) Foreign Application Priority Data

Apr. 22, 1998 (JP) .......................................... 10-112531

(51) Int. Cl.[7] .................................................. G02B 6/36

(52) U.S. Cl. ............................ 385/84; 385/60; 385/67; 385/78

(58) Field of Search ............................ 385/84, 60, 66, 385/67, 68, 78

(56) References Cited

U.S. PATENT DOCUMENTS 4,787,698 A * 11/1988 Lyons et al. ............... 350/96.2
5,778,126 A * 7/1998 Saitoh ......................... 385/84
5,852,694 A * 12/1998 Kimura et al. ................ 385/78
5,862,280 A * 1/1999 Tanaka et al. ................ 385/78
5,946,436 A * 8/1999 Takashi ....................... 385/60

FOREIGN PATENT DOCUMENTS

DE 3534219 A1 * 4/1987 ............... 385/67 X

* cited by examiner

*Primary Examiner*—Akm E. Ullah
*Assistant Examiner*—Jennifer Doan
(74) *Attorney, Agent, or Firm*—Adams & Wilks

(57) ABSTRACT

To provide a ferrule tubular body and a ferrule which is free from a fear that the end face of the ferrule may be roughened, which can eliminate an eccentric adjustment process performed after an optical fiber is fixed, and which can attain the optical connection less in insertion loss. An indicator section 1*d*, 3*a*, 1*e* or 3*b* making it possible to observe an eccentric direction of a though-hole to which an exposed optical fiber end portion is inserted to be held is provided on the outer surface of a ferrule tubular body 1A, 1B, 1C, 1D and/or the outer surface of a flanged member 3A, 3B, 3C, 3D securely fixed to the rear end of the ferrule tubular body 1A, 1B, 1C, 1D.

28 Claims, 5 Drawing Sheets

FERRULE TUBULAR BODY AND FERRULE

BACKGROUND OF THE INVENTION

The present invention relates to a ferrule that is a plug side member included in an optical connector for optical connection, and to a ferrule tubular body that is a member included in the ferrule.

To optically connect the end portions of optical fibers to each other, an optical connector is used, which includes a plug for fixing the end portions of the optical fibers and an adaptor fitted to the plug from respective opposite sides. The aforementioned optical connector is classified into various types such as SC type, MU type and so on, and employs an eccentric adjustment in order to eliminate an insertion loss (a loss of optical signals) in optical connection as much as possible.

The eccentric adjustment method which has been employed conventionally will be described with reference to FIGS. 6 and 7. First, as shown in FIG. 6, a flanged member 82, which is formed with key grooves 82*a* at angular intervals of 90 degrees, is securely fixed to the rear end portion of a ferrule tubular body 81, and an optical fiber F1 that appears by removing a sheath of one end of an optical cord F by a predetermined length is inserted into and securely fixed to a through-hole 81*a*, so that the optical cord F having a required length is set to be connected to the ferrule 8.

A measurement device 9 as shown in FIG. 7 will be described briefly. The measurement device 9 includes a light source section 91, an adjust plug 93 connected to the light source section 91 through an adjust cord 92 so as to make an optical axis eccentric in a predetermined direction, an adaptor 94 for facing and engaging the adjust plug 93 and the ferrule 8 with each other, and optical power-meter 95 for measuring the luminous energy. On the ferrule side of the adaptor 94, one key (not-shown) for engagement with the key groove 7*a* is provided in order to indicate the eccentric direction of the adjust plug 93.

The measuring device 9 thus constructed is set such that the ferrule 8 is engaged with the adaptor 94 with the key groove 82*a* matched with the key as well as the open end portion of the optical cord F is connected to the optical power-meter 95. Then, the light is turned on, and a value indicated by the optical power-meter 95 is read. Next, the ferrule 8 is removed from the adaptor 94, rotated by 90 degrees, and again engaged with the adaptor 94, so that a value indicated by the optical power-meter 95 is read.

Further, this procedure is repeated twice, and a mark is applied to a key groove 82*a* that causes the value of the optical power-meter 95 to be maximum (the luminous energy to be maximum). Thereafter, the assembly is carried out to a housing of a desired external appearance, such as the SC type, MU type or the like, which is provided with a key indicating the eccentric direction, so that the marked key groove 82*a* is aligned with the key.

As explained above, in the conventional art, the eccentric adjustment is performed such that the optical connection is established actually in a state in which the optical cord F having a required length is connected to the ferrule 8. Through the aforementioned process, plugs which are lower in insertion loss with respect to the adjust plug 93 whose optical axis is eccentric at a predetermined amount are mass-produced. By using these plugs, an optical connection always stabilized in insertion loss can be realized.

The eccentric adjustment in accordance with this system is preferable in view of the fact that an optical connection always stabilized in insertion loss can be realized. However, the adjustment needs the insertion and removal of the ferrule into and out of the adaptor, and thus it has been pointed out that the end face of the ferrule may roughened, which causes a problem in the process.

Further, it is impossible to realize an optical connection in which the insertion loss is further reduced by the adjustment of this system in which, as mentioned above, the luminous energy is measured at intervals of every 90 degrees (four-equi-angular-interval distribution) using the key engagement with respect to the adjust plug whose optical axis is made eccentric at the predetermined amount and the direction (the key groove) at which the insertion loss is the smallest among them is regarded as the eccentric direction.

Accordingly, it is an object of the present invention to provide a ferrule tubular body and a ferrule which is free from the fear that the end face of the ferrule may be roughened, which can eliminate the eccentric adjustment process performed after the optical fiber is fixed, and which can attain an optical connection in which the insertion loss is further reduced.

SUMMARY OF THE INVENTION

A first aspect of the present invention for solving the aforementioned problems is embodied in a ferrule tubular body having a through-hole to which an end portion of an optical fiber is inserted to be held, the ferrule tubular body being characterized by including an indicator section for indicating an eccentric direction of the through-hole with respect to a center of an outer circumference of the body.

A second aspect of the present invention is based on the ferrule tubular body as set forth in the first mode, and is characterized in that the indicator section is a visual indication provided on an outer circumferential surface of the ferrule tubular body.

A third aspect of the present invention is based on the ferrule tubular body as set forth in the first mode, and is characterized in that the ferrule indicator section is a recess provided in an outer circumferential surface of the ferrule tubular body.

A fourth aspect of the present invention is based on the ferrule tubular body as set forth in the second or third mode, and is characterized in that the indicator section is provided on at least one of a leading end portion and a rear end portion of the ferrule tubular body.

A fifth aspect of the present invention is embodied in a ferrule including a ferrule tubular body having a through-hole to which an end portion of an optical fiber is inserted to be held, and a flanged member securely fixed to a rear end portion of the ferrule tubular body, the ferrule being characterized in that an indicator section indicating an eccentric direction of the through-hole with respect to a center of an outer circumference of the ferrule tubular body is provided on at least one of the ferrule tubular body and the flanged member.

A sixth aspect of the present invention is based the ferrule as set forth in the fifth mode, and is characterized in that the indicator section is an indication or a recess provided on a leading end of the ferrule.

A seventh aspect of the present invention is based on the ferrule as set forth in the fifth mode, and is characterized in that the indicator section is a visual indication or a recess provided on the flanged member.

As factors of this eccentricity hindering the optical connection, it can be pointed out the following; e.g. that an optical fiber is not held at the center of a through-hole of a ferrule, a core is not positioned at the center of the optical fiber, a through-hole is not opened at the center of the outer circumference of a ferrule tubular body, and so on. The eccentricities in the held position of optical fiber with respect to the through-hole of the ferrule and the position of the core within the optical fiber are minute and thus can be disregarded in contrast to the eccentricity in the position of the through-hole in the ferrule. Accordingly, since the present invention makes it possible to recognize the eccentric direction of the through-hole, the eccentric adjustment with high precision in comparison with the conventional eccentric adjustment can be realized.

In addition, it is not essential to provide the indicator sections noted above in the eccentric direction of the through-hole with respect to the center of the outer circumference of the ferrule tubular body. That is, it suffices that the eccentric direction of the through-hole can be observed relatively from the external side.

DESCRIPTION OF THE PREFERRED EMBODIMENTS

Next, embodiments of a ferrule tubular body and a ferrule in accordance with the present invention will be described with reference to the drawings.

Figure 1:
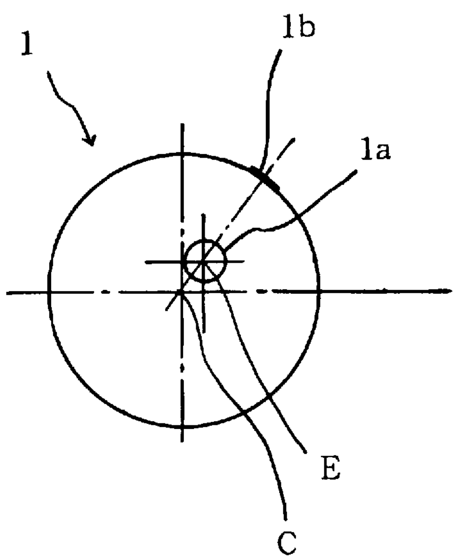
FIG. 1 is a plan view showing the leading end side of a ferrule tubular body in accordance with the present invention.
Figure 2A:
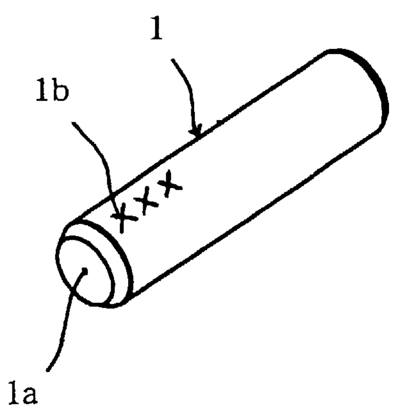
FIGS. 2A and 2B are perspective view showing the ferrule tubular bodies in accordance with the present invention.
Figure 2B:
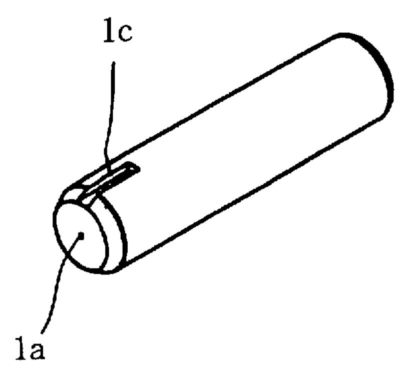
Figure 3A:
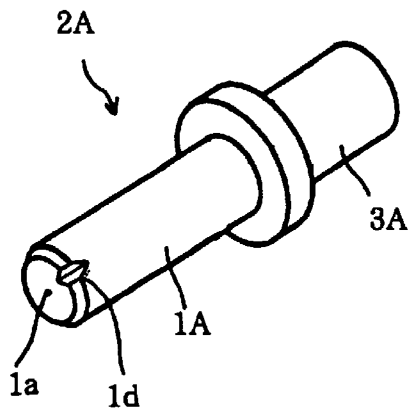
FIGS. 3A, 3B, 3C and 3D are perspective view showing ferrules in accordance with the present invention.
Figure 3B:
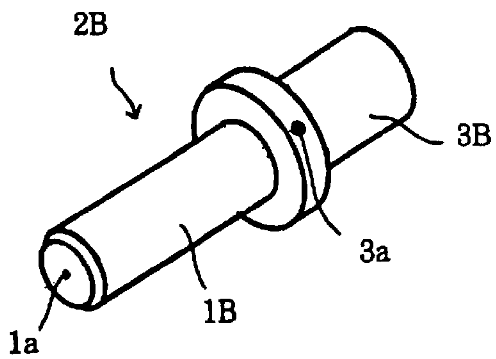
Figure 3C:
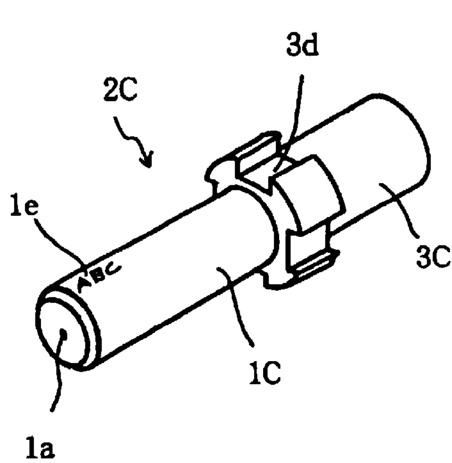
Figure 3D:
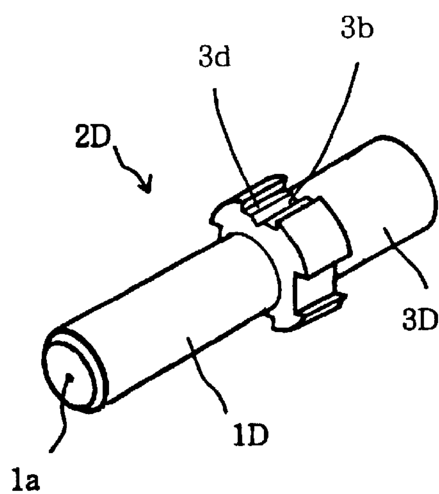
Figure 4:
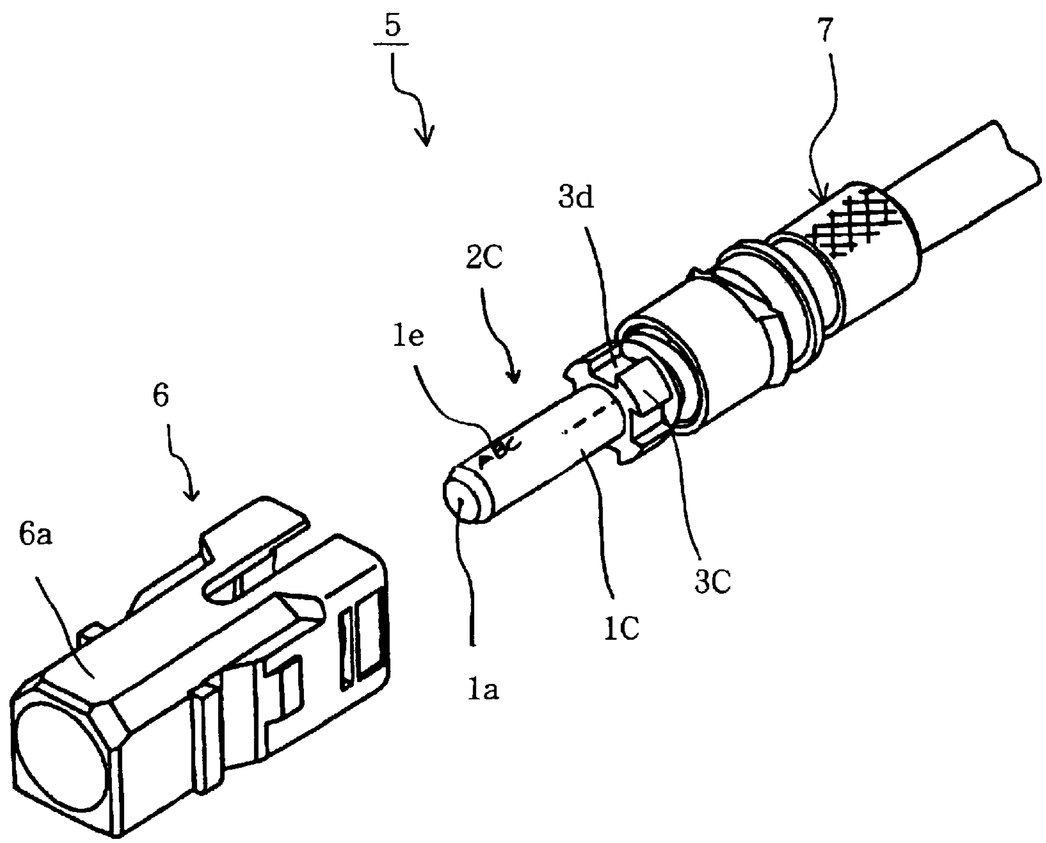
FIG. 4 is an exploded perspective view showing a plug using the ferrule in accordance with the present invention.
Figure 5:
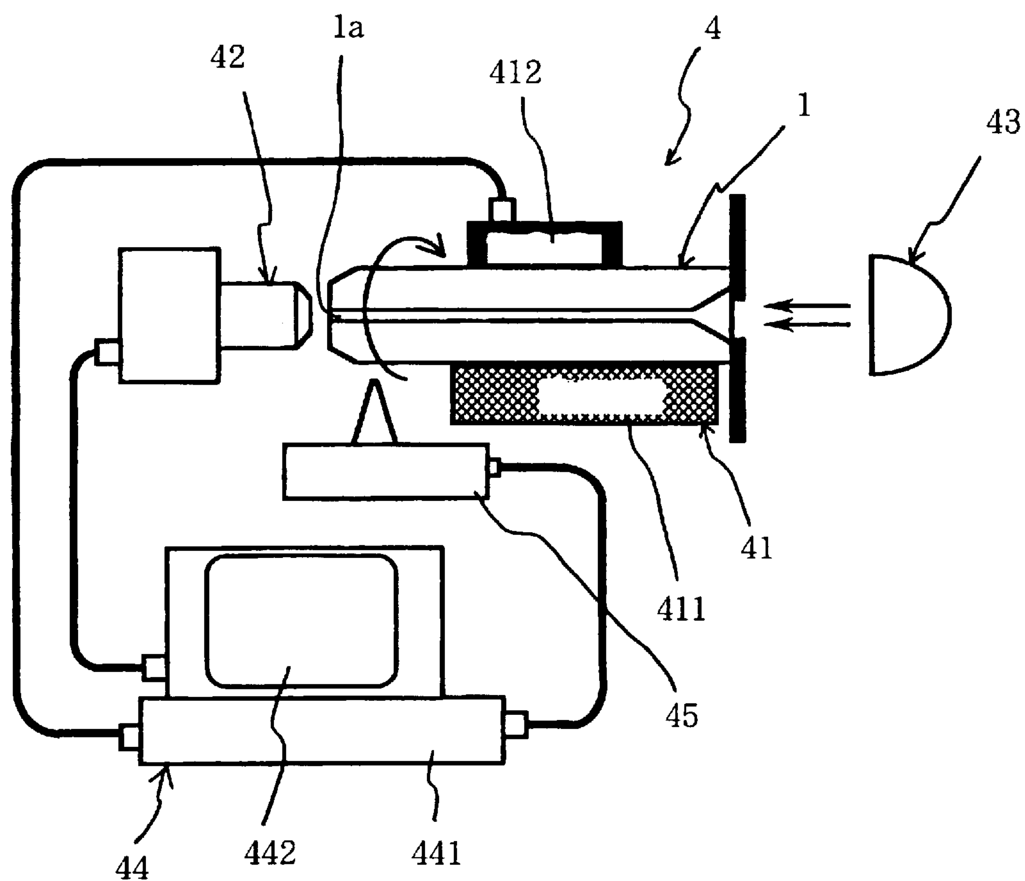
FIG. 5 shows a detector for detecting an eccentric direction of a through-hole opened through the ferrule tubular body or the ferrule in accordance with the present invention.
Figure 6:
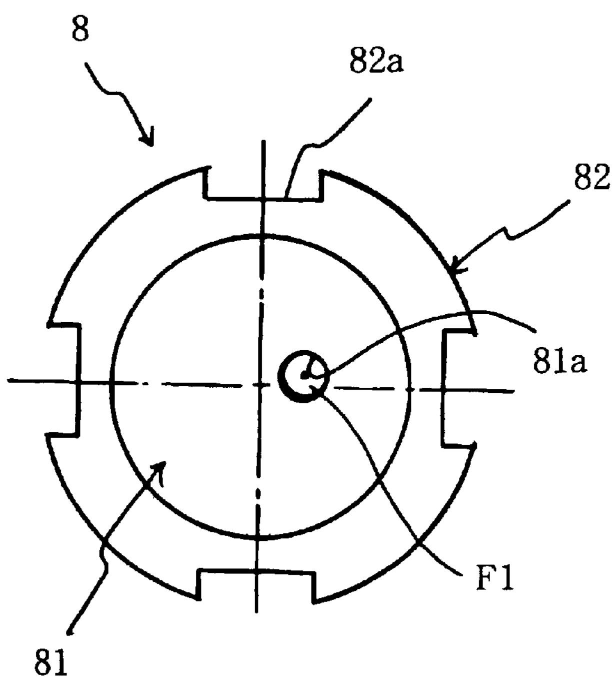
FIG. 6 is a plan view for explanation about the conventional art, showing the leading end side in a state where an exposed optical fiber is inserted into and securely fixed to a ferrule.
Figure 7:
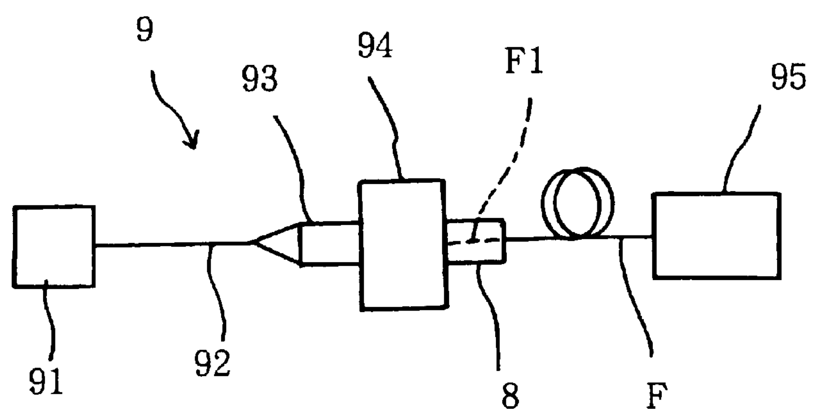
FIG. 7 is aschematic view showing a measurement device for measuring the core eccentricity, which is used in the conventional art.

FIGS. 1 and 2A–2B shows embodiments of a ferrule tubular body 1 in accordance with the present invention, FIGS. 3A–3D and 4 show embodiments of a ferrules 2A–2D in accordance with the present invention, and FIG. 5 shows a detector 4 for detecting an eccentric position of the ferrule tubular body 1 or the ferrule 2A–2D in accordance with the present invention.

First of all, the embodiments of the ferrule tubular body 1 in accordance with the present invention will be described. The ferrule tubular body 1 is a member having a cylindrical outer surface and is included in a ferrule that itself is a plug side member included in an optical connector for optical connection. As shown in FIG. 1, the ferrule tubular body 1 is a tubular member made of a ceramic, such as zirconia or the like, or stainless steel or the like, and provided at its substantially central portion with a through-hole 1*a* into which an optical fiber from which a sheath of a predetermined length is removed from one end of an optical cord is insertable. This through-hole 1*a* is essentially required to be opened at and aligned on the axis C of the ferrule tubular body 1, but actually it is opened and provided at a slightly eccentric position E as illustrated in FIG. 1.

On the leading end portion of the ferrule tubular body 1, an indicator section 1*b* in the form of a desired character, mark or the like is provided as a permanent marking in the vicinity of the position at which an imaginary line passing from the axis C through the hole center E of this through hole 1*a* intersects the outer surface of the ferrule tubular body 1, i.e. on the eccentric direction outer surface with respect to the axis C, so that the eccentric direction of the through-hole 1*a* can be observed. This indicator section 1*b* is not limited to one indicated by a marking, and as shown in FIG. 2B, it may be a recess (an indicator section) 1*c* formed as a consequence of notching the outer surface of the ferrule tubular body 1 into a recessed configuration. Further, it may be formed instead of or in addition to that illustrated on the rear end portion of the ferrule tubular body 1.

These indicator sections 1*b* and 1*c* provided on the leading end portions are preferable since each of these can be observed after the flanged member has been securely fixed to the rear end portion. Since the marking such as a simple printing or the like may disappear, the one that is formed as a consequence of the notching as described above is further preferable. Moreover, the provision of the indicator section at the rear end portion does not cause any possible hinderance in optical connection, but there is a possibility that the indicator section cannot be observed after the flanged member is securely fixed. Therefore it is preferable that the flanged member formed preliminarily with an indicator section is securely fixed so as to be aligned with the indicator section formed on the rear end portion of the ferrule tubular body 1.

Next, the embodiments of ferrules 2A, 2B, 2C and 2D in accordance with the present invention will be described with reference to FIGS. 3A–3D. The ferrules 2A, 2B, 2C and 2D in accordance with the present invention are constructed by securely fixing flanged members 3A, 3B, 3C and 3D to the rear end portions of ferrule tubular bodies 1A, 1B, 1C and 1D, respectively, and each of these ferrules is a plug side member that is used upon assembly into a housing of a desired outer appearance such as SC type, MU type or the like and that is included in an optical connector for optical connection. Indicator sections 1*d*, 3*a*, 1*e* and 3*b* of respective modes, as shown in the drawing, with which the eccentric directions of the through-holes 1*a* with respect to the axes C of the ferrule tubular bodies 1A, 1B, 1C and 1D can be observed, are provided on the ferrule tubular bodies 1A, 1B, 1C and 1D or the flanged members 3A, 3B, 3C and 3D of the ferrules 2A, 2B, 2C and 2D.

That is, the recess (the indicator section) 1*d* is formed by notching a part of the chamfered portion at the leading end outer surface of the ferrule tubular body 1A as shown in FIG. 3A, the indicator section 3*a* is indicated by a dot-like marking on the outer surface of the flanged member 3B as shown in FIG. 3B, the indicator section 1*e* is indicated by a marking on the leading end outer surface of the ferrule tubular body 1C as shown in FIG. 3C, and the recess (the indicator section) 3*b* is formed by notching, into the substantially V-shaped form, the bottom portion located within the key groove 3*d* of the flanged member 3D as shown in FIG. 3D. In addition, these may be combined in arbitrary manner.

Further, these ferrules 2A, 2B, 2C and 2D may be provided such that the ferrule tubular bodies 1A, 1B, 1C and 1D on which eccentric directions are first detected are securely fixed to the flanged members 3A, 3B, 3C and 3D in a posterior process, and alternatively such that the ferrule tubular bodies 1A, 1B, 1C and 1D are securely fixed to the flanged members 3A, 3B, 3C and 3D preliminarily and then the eccentric directions are detected in the posterior process to provide the indicator sections 1*d*, 3*a*, 1*e* and 3*b*.

Each of the ferrules 2C and 2D, in which four key grooves 3*d* are circumferentially provided on the flanged member 3C or 3D at the constant angular intervals, is used, for instance, as a member included in an SC plug 5 as shown in FIG. 4 (the ferrule 2C exemplified by and shown in FIG. 3C is illustrated in FIG. 4), and it is engaged with and integrated to a plug frame 6 of the SC plug 5, which has a key for engagement with the four key grooves 3*d* distributed at the constant angular intervals.

On the inner surface of this plug frame 6 there is formed the key (not shown) which is opposed to a chamfered upper surface 6*a* in the perpendicular direction. The plug frame 6 is engaged with a stop ring 7 under a condition that either of the key grooves 3*d* is fitted to this key. Since the plug frame 6 is designed so that its upper surface 6*a* side is aligned with the eccentric direction, the integration is performed such that the key groove 3*d* is engaged with the key of the plug frame 6 while the indicator section 1*e* indicating the eccentric direction is located at the upper surface 6*a* side.

Next, a detector 4 for detecting the eccentric direction of the through-hole 1*a* opened through the ferrule tubular body 1 will be described with reference to FIG. 5. The detector 4 includes a mounting section 41, an imaging section 42, illumination section 43, an image processing section 44 and a marking section 45. The mounting section 44 is constructed by a V-block 411 for supporting the ferrule tubular body 1, i.e. the subject to be detected, and a roller portion 412 contacted with the ferrule tubular body 1 thus supported to rotate the ferrule tubular body 1. This roller portion 412 is electrically communicated with the later described image processing section 44 so that its rotation can be controlled by a control signal sent from the image processing section 44.

The imaging section 42 is comprised of a CCD camera that is disposed in the vicinity of the mounting section 41 and directed toward the leading end face of the ferrule tubular body 1 so as to capture a partial image of and around the through-hole 1*a* within the leading end face of the ferrule tubular body 1 in a magnification manner. The image section is electrically communicated with the later described image processing section 44 so that a signal of the image thus captured can be transmitted to the image processing section 44. In addition, the rate of this magnification of the subject to be imaged is such a degree that a boundary line between the through-hole 1*a* and a structural surface therearound, i.e. a part of peripheral edge portion is divided into two halves perpendicularly on a monitor that will be described later.

The illumination section 43 is disposed on the rear end face side of the ferrule tubular body 1, and designed to illuminate the rear end face of the ferrule tubular body 1 so as to obtain an image contrast with which the through-hole 1*a* and the surface therearound can be recognized clearly. The image processing section 44 is comprised of a controller 441 in which a required control program is installed, and a monitor 442 electrically communicated with the controller 441. A sequence of the operation thereof will be described later.

The marking section 45 is electrically communicated with the image processing section 44 so that in accordance with the command from the image processing section 44 a required mark is applied by marking of a laser marking type onto the outer surface of the ferrule tubular body 1 located in the eccentric direction and in the vicinity of the leading end portion. In the detector 4 thus constructed, the control program is executed to start rotating the ferrule tubular body 1 mounted on the V-block 411 and contacted at its side surface with the roller 412, and concurrently the image processing section 42 captures images in the magnification manner so that a part of the peripheral edge portion of the through-hole 1*a* within the leading end surface of the ferrule tubular body 1 is divided into two halves perpendicularly on the monitor 442.

In this operation, the signals of the images successively captured are transmitted to the control section 441, and binarized using a predetermined threshold value, so that the binarized image (an image consisting of a white component (1) and a black component (0)) is displayed on the monitor such that the boundary line is shifted laterally on a screen depending on the eccentricity. Concurrently, positional data obtained by sampling the boundary every predetermined rotational angles are stored successively in a frame memory provided within the controller 441 until the ferrule tubular body is rotated by one turn (360 degrees). After the sampling is complete, a rotational angle at which the most white components are contained is selected from the rotational angles at which the sampling has been carried out (in a case where the image indicating the through-hole 1*a* is set as the white component image), and the ferrule tubular body 1 is rotated to that rotational angle. Thereafter, a desired character, mark or the like is applied by the marking section to provide the indicator section 1*b* with which the eccentric direction of the through-hole 1*a* can be observed at a glance.

In addition, the detection by this detector can be made not only on the ferrule tubular body but also on the ferrule in which the flanged member 3 is securely fixed to the rear end portion of the ferrule tubular body 1. Further, the detection process carried out using this detector is not limited to one that has been described above, and it may be carried out such that the eccentric direction is detected in a static manner without the rotation of the ferrule tubular body 1. Further, it is not particularly limited to the use of this detector, as long as the eccentric direction can be detected in a non-contact manner.

The present invention thus constructed provides the following advantageous effects. By preliminarily providing the ferrule tubular body or the ferrule, in which the eccentric direction of the through-hole can be observed, it is possible to construct the plug the eccentric direction of which can be confirmed without the eccentric adjustment requiring the insertion and removal of the ferrule into and out of the adaptor at every rotations of 90 degrees (four-equi-angular-interval distribution) after the optical fiber has been already assembled to the adaptor. Further, since this eccentric adjustment per se is eliminated, the problem caused due to the insertion and removal of the ferrule into and the out of the adaptor, for instance, the roughening of the ferrule end face, can be eliminated, thereby making it possible to construct the high-quality plug.

Further, in contrast to the system in which the luminous energy is measured at every rotations of 90 degrees (four-equi-angular-interval distribution) and the direction at which the insertion loss is the smallest among them is regarded as the eccentric direction, the plug can be constructed using the actual eccentric direction. The use of the plugs including the ferrule tubular bodies or the ferrules obtained in this manner makes the optical connection less in the insertion loss.

What is claimed is:

1. A ferrule comprising: a ferrule tubular body having a cylindrical outer surface and a through-hole formed therethrough with a diameter sufficient to receive and hold an end portion of an optical fiber; a flanged member securely fixed to a rear end portion of the ferrule tubular body; and an indicator for indicating an eccentric direction of the through-hole with respect to a center of the cylindrical outer surface of the ferrule tubular body, the indicator comprising a permanent marking provided on at least one of the cylindrical outer surface of the ferrule tubular body and the flanged member.

2. The ferrule as claimed in claim 1; wherein the indicator comprises one of a marking and a recess provided proximate one of a leading end of the ferrule and a rear end of the ferrule.

3. The ferrule as claimed in claim 1; wherein the indicator comprises one of an indication and a recess provided on the flanged member.

4. In a ferrule tubular body having a through-hole: an indicator for indicating an eccentric direction of the through-hole with respect to a center of an outer circumference of the body; and a flanged member securely fixed to a rear end portion of the ferrule tubular body.

5. The ferrule tubular body as claimed in claim 4; wherein the indicator is provided on the flanged member.

6. The ferrule tubular body as claimed in claim 4; wherein the indicator comprises a marking provided on the flanged member.

7. The ferrule tubular body as claimed in claim 4; wherein the indicator comprises a recess formed in the flanged member.

8. The ferrule tubular body as claimed in claim 4; wherein the indicator is positioned proximate at least one of a leading end portion and a rear end portion of the ferrule tubular body.

9. The ferrule tubular body as claimed in claim 4; wherein the indicator is applied to an outer circumferential surface of the ferrule tubular body.

10. The ferrule tubular body as claimed in claim 4; wherein the indicator comprises one of a marking, a recess and an indication.

11. The ferrule tubular body as claimed in claim 4; wherein the indicator comprises one of a marking and a recess provided proximate one of a leading end of the ferrule tubular body and a rear end of the ferrule tubular body.

12. The ferrule tubular body as claimed in claim 4; wherein the indicator comprises one of an indication and a recess provided on the flanged member.

13. A method of providing an indication on a ferrule tubular body for indicating an eccentric direction of a through-hole formed in the ferrule body with respect to a center of a cylindrical outer surface of the tubular body, comprising the steps of:

mounting the ferrule tubular body on a support having means for rolling the ferrule tubular body about its central axis;

rolling the ferrule tubular body about its central axis while illuminating the ferrule tubular body at the one end;

detecting an image of one end of the ferrule tubular body at a plurality of positions while the ferrule tubular body is being rolled;

detecting an eccentric direction of the through-hole with respect to the center of the cylindrical outer surface of the tubular body based on the detected images; and providing a marking on the ferrule tubular body in the detected eccentric direction.

14. A ferrule comprising: a tubular body having an outer surface and a through-hole formed for accommodating an optical fiber; a flanged member fixed to a rear end portion of the tubular body; and an indicator comprising a permanent marking provided on the cylindrical outer surface in the vicinity of a position at which an imaginary line passing from a central axis of the tubular body through a center of the through-hole center intersects the outer surface of the tubular body, so that an eccentric direction of the through-hole can be observed from the outer surface of the ferrule.

15. A ferrule according to claim 14; wherein the indicator is formed on the flanged member.

16. A ferrule according to claim 14; wherein the indicator comprises a marking imprinted on the flanged member.

17. A ferrule according to claim 14; wherein the indicator comprises a recess formed in the flanged member.

18. A detector for detecting an eccentric direction of a through-hole in a ferrule tubular body with respect to a center of an outer surface of the tubular body, comprising:

a mounting section for rotatably supporting the ferrule tubular body about a central axis thereof;

an illumination section for illuminating the ferrule tubular body at a first end thereof;

an imaging section for detecting an image of a second end of the ferrule tubular body opposite the first end at a plurality of positions while the ferrule tubular body is being rotated about its central axis;

an image processing section for processing images output by the imaging section and determining an eccentric direction of the through-hole with respect to the central axis of the ferrule tubular body; and a marking section for applying a marking to the ferrule tubular body to indicate the eccentric direction of the through-hole determined by the image processing section.

19. A detector according to claim 18; wherein the mounting section comprises a V-shaped support for supporting the ferrule tubular body, and a roller contacting the ferrule tubular body through the support to rotate the ferrule tubular body based on a signal output by the image processing section.

20. A detector according to claim 18; wherein the imaging section comprises a CCD camera disposed in the vicinity of the mounting section and directed toward the second end of the ferrule tubular body for capturing images of the through-hole at the second end of the ferrule tubular body as the ferrule tubular body is being rotated and transmitting the captured images to the image processing section.

21. A detector according to claim 20; wherein the imaging section further comprises means for magnifying the images so that a boundary line between the through-hole and a portion of the tubular body surrounding the through-hole is divided into two halves, and monitor for displaying the magnified images.

22. A detector according to claim 18; wherein the image processing section comprises a controller for storing and executing a control program, and a monitor connected to the controller.

23. A detector according to claim 18; wherein the marking section comprises a laser connected to the image processing section for marking the outer surface of the ferrule tubular body in accordance with a signal output by the image processing section.

24. A ferrule comprising: a ferrule tubular body having a cylindrical outer surface and a through-hole formed therethrough with a diameter sufficient to receive and hold an end portion of an optical fiber; a flanged member fixedly secured to a rear end portion of the ferrule body; and an indicator for indicating an eccentric direction of the through-hole with respect to a center of the cylindrical outer surface of the ferrule tubular body.

25. A ferrule as claimed in claim 24; wherein the indicator is provided on at least one of the cylindrical outer surface of the ferrule tubular body and the flange member.

26. A ferrule as claimed in claim 24; wherein the indicator comprises one of a marking, a recess and an indication.

27. A ferrule as claimed in claim 24; wherein the indicator comprises one of a marking and a recess provided proximate one of a leading end of the ferrule tubular body and a rear end of the ferrule tubular body.

28. A ferrule tubular body as claimed in claim 24; wherein the indicator comprises one of an indication and a recess provided on the flanged member.

* * * * *